United States Patent
Adams et al.

(10) Patent No.: US 9,513,604 B2
(45) Date of Patent: Dec. 6, 2016

(54) MULTI-MEDIA WIRELESS WATCH

(71) Applicant: I. AM. PLUS, LLC, Los Angeles, CA (US)

(72) Inventors: William Adams, Los Angeles, CA (US); Chandrasekar Rathakrishnan, Singapore (SG); Jaren Chee Wei Goh, Singapore (SG)

(73) Assignee: I.AM.PLUS, LLC, Los Angeles, CA (US)

( * ) Notice: Subject to any disclaimer, the term of this patent is extended or adjusted under 35 U.S.C. 154(b) by 0 days.

(21) Appl. No.: 14/460,300

(22) Filed: Aug. 14, 2014

(65) Prior Publication Data

US 2015/0049591 A1    Feb. 19, 2015

Related U.S. Application Data

(60) Provisional application No. 61/866,372, filed on Aug. 15, 2013.

(51) Int. Cl.
| | |
|---|---|
| *G04G 21/08* | (2010.01) |
| *G04G 21/04* | (2013.01) |
| *G04G 9/00* | (2006.01) |
| *G04G 21/06* | (2010.01) |
| *G06F 3/041* | (2006.01) |
| *G06F 1/16* | (2006.01) |

(52) U.S. Cl.
CPC ............ *G04G 21/08* (2013.01); *G04G 9/0064* (2013.01); *G04G 9/0082* (2013.01); *G04G 21/04* (2013.01); *G06F 1/163* (2013.01); *G06F 3/0412* (2013.01); *G04G 21/06* (2013.01)

(58) Field of Classification Search
CPC ..................... G06F 1/163; G06F 3/041–3/047; G04G 21/00–21/08
See application file for complete search history.

(56) References Cited

U.S. PATENT DOCUMENTS

| | | |
|---|---|---|
| 4,159,416 A | 6/1979 | Brejnik et al. |
| 5,088,070 A | 2/1992 | Shiff |
| 5,418,760 A | 5/1995 | Kawashima et al. |
| D366,036 S | 1/1996 | Houlihan |
| 5,793,032 A * | 8/1998 | Bard ................. G04B 37/0016 235/462.15 |

(Continued)

FOREIGN PATENT DOCUMENTS

| | | |
|---|---|---|
| WO | 2015023955 | 2/2015 |
| WO | 2016060848 | 4/2016 |

OTHER PUBLICATIONS

Hutchings, Emma, "Ideas for Innovation", Mar. 29, 2012, from www.psfk.com/2012/03/touch-screen-bracelet-text.html.*

(Continued)

*Primary Examiner* — Larry Sternbane
(74) *Attorney, Agent, or Firm* — Workman Nydegger

(57) ABSTRACT

A method for interacting with a user through a smart watch can include displaying an interactive image. The method can further include detecting a contact moving continuously from a first edge of the touch-sensitive display toward a second, opposite edge of the touch-sensitive display. In response to the detection, the touch-sensitive display can display select function indicators in accordance with movement of the contact. The select function indicators can comprise four or fewer distinct, selectable icons.

19 Claims, 15 Drawing Sheets

(56) References Cited

U.S. PATENT DOCUMENTS

| | | |
|---|---|---|
| D412,445 S | 8/1999 | Bodino |
| D413,531 S | 9/1999 | Philippe |
| D432,437 S | 10/2000 | Lassigne |
| D447,702 S | 9/2001 | Bodino |
| 6,329,903 B1 | 12/2001 | Yamamori |
| 6,477,117 B1 | 11/2002 | Narayanaswami et al. |
| D466,487 S | 12/2002 | Wada et al. |
| D471,471 S | 3/2003 | Fu et al. |
| 6,661,438 B1 | 12/2003 | Shiraishi et al. |
| 6,707,764 B2 | 3/2004 | Davidson et al. |
| 7,162,217 B2 | 1/2007 | Bisig |
| D543,192 S | 5/2007 | Jung |
| D549,221 S | 8/2007 | Yagi |
| 7,263,461 B2 | 8/2007 | Sugai |
| D564,367 S | 3/2008 | Molyneux |
| D565,427 S | 4/2008 | Ellner et al. |
| D567,227 S | 4/2008 | Hada |
| D567,676 S | 4/2008 | Tang |
| D570,711 S | 6/2008 | Dorsz |
| D576,501 S | 9/2008 | Tang |
| D582,940 S | 12/2008 | Carpenter et al. |
| D584,972 S | 1/2009 | Aeberhard et al. |
| D587,726 S | 3/2009 | Tarara et al. |
| D589,374 S | 3/2009 | Tang |
| D596,610 S | 7/2009 | Hou |
| D619,616 S | 7/2010 | Esterly et al. |
| D621,413 S | 8/2010 | Rasmussen |
| D621,415 S | 8/2010 | Umezawa |
| D621,726 S | 8/2010 | Lattmann |
| D621,808 S | 8/2010 | Kim |
| D623,195 S | 9/2010 | La et al. |
| D626,132 S | 10/2010 | McLaughlin |
| D637,918 S | 5/2011 | Cobbett et al. |
| D638,723 S | 5/2011 | Ong |
| D640,281 S | 6/2011 | Davis |
| D642,195 S | 7/2011 | Marks |
| D642,198 S | 7/2011 | Guss et al. |
| D643,047 S | 8/2011 | Guss et al. |
| D645,880 S | 9/2011 | Guss et al. |
| D650,706 S | 12/2011 | Zanella et al. |
| 8,088,043 B2 | 1/2012 | Andren et al. |
| D659,711 S | 5/2012 | Guss et al. |
| D661,275 S | 6/2012 | Roka |
| D665,818 S | 8/2012 | Anzures |
| D667,431 S | 9/2012 | Phelan |
| 8,279,716 B1 | 10/2012 | Gossweiler et al. |
| 8,301,211 B2 | 10/2012 | Lee et al. |
| D671,143 S | 11/2012 | Phelan |
| D672,255 S | 12/2012 | Zanella et al. |
| D682,309 S | 5/2013 | Steele et al. |
| D686,241 S | 7/2013 | Steele et al. |
| D686,637 S | 7/2013 | Anzures |
| D687,064 S | 7/2013 | Jang et al. |
| D691,633 S | 10/2013 | Abratowski et al. |
| D692,457 S | 10/2013 | Abratowski et al. |
| D703,069 S | 4/2014 | Adams |
| 8,725,842 B1 | 5/2014 | Al-Nasser |
| D709,094 S | 7/2014 | Jogano |
| D711,917 S | 8/2014 | Jang et al. |
| D712,927 S | 9/2014 | Worthington et al. |
| D716,343 S | 10/2014 | Baumann et al. |
| 8,851,372 B2* | 10/2014 | Zhou .............. G06F 1/163 235/380 |
| D719,186 S | 12/2014 | Kim |
| D724,603 S | 3/2015 | Williams et al. |
| 8,994,827 B2* | 3/2015 | Mistry .............. H04N 5/2252 348/158 |
| D729,839 S | 5/2015 | Bray et al. |
| D733,185 S | 6/2015 | Smith et al. |
| D735,235 S | 7/2015 | Zhou |
| D735,737 S | 8/2015 | Lee et al. |
| D743,999 S | 11/2015 | Villamor et al. |
| D745,054 S | 12/2015 | Bray |
| D746,313 S | 12/2015 | Walmsley et al. |
| D747,347 S | 1/2016 | Park et al. |
| D747,348 S | 1/2016 | Park et al. |
| D747,727 S | 1/2016 | Lee et al. |
| D747,738 S | 1/2016 | Park et al. |
| D748,140 S | 1/2016 | Park et al. |
| D748,144 S | 1/2016 | Kwon et al. |
| D749,109 S | 2/2016 | Lee et al. |
| D751,082 S | 3/2016 | Hurst et al. |
| D752,063 S | 3/2016 | Nuovo |
| D752,604 S | 3/2016 | Zhang |
| D752,623 S | 3/2016 | Dye et al. |
| D753,696 S | 4/2016 | Dye et al. |
| D753,702 S | 4/2016 | Zhou et al. |
| D755,228 S | 5/2016 | Lee et al. |
| D755,855 S | 5/2016 | Wooten |
| D757,100 S | 5/2016 | Butcher et al. |
| D757,798 S | 5/2016 | Akana |
| D757,806 S | 5/2016 | Choi |
| D758,426 S | 6/2016 | Park |
| D760,276 S | 6/2016 | Huang et al. |
| D760,286 S | 6/2016 | Park |
| D760,290 S | 6/2016 | Huang et al. |
| D761,308 S | 7/2016 | Jewitt |
| D763,874 S | 8/2016 | Boix |
| D763,914 S | 8/2016 | Butcher et al. |
| D763,922 S | 8/2016 | Huang et al. |
| D764,512 S | 8/2016 | McNeil et al. |
| D764,528 S | 8/2016 | Choi et al. |
| D765,693 S | 9/2016 | Chaudhri et al. |
| D766,315 S | 9/2016 | Choi et al. |
| D766,950 S | 9/2016 | Dye et al. |
| 2001/0017663 A1 | 8/2001 | Yamaguchi et al. |
| 2003/0030595 A1* | 2/2003 | Radley-Smith ...... A44C 5/0007 345/1.3 |
| 2003/0125077 A1 | 7/2003 | Lee et al. |
| 2007/0132789 A1 | 6/2007 | Ording et al. |
| 2007/0152980 A1 | 7/2007 | Kocienda et al. |
| 2009/0199130 A1 | 8/2009 | Tsern et al. |
| 2009/0231960 A1* | 9/2009 | Hutcheson .............. G04G 17/04 368/10 |
| 2010/0275033 A1 | 10/2010 | Gillespie et al. |
| 2010/0331145 A1 | 12/2010 | Lakovic et al. |
| 2011/0059769 A1* | 3/2011 | Brunolli ................. G08C 17/02 455/556.1 |
| 2011/0060587 A1 | 3/2011 | Phillips et al. |
| 2011/0090148 A1* | 4/2011 | Li ............................ G06F 1/163 345/158 |
| 2011/0157029 A1 | 6/2011 | Tseng |
| 2011/0255379 A1* | 10/2011 | Vidal ..................... G04G 9/047 368/70 |
| 2012/0004932 A1* | 1/2012 | Sorkey .................. G06Q 10/06 705/3 |
| 2012/0030566 A1 | 2/2012 | Victor |
| 2012/0092383 A1 | 4/2012 | Hysek et al. |
| 2012/0099406 A1 | 4/2012 | Lau et al. |
| 2012/0122519 A1* | 5/2012 | Jochheim ............... H04B 1/385 455/556.1 |
| 2013/0045037 A1* | 2/2013 | Schaffer ................. G06F 1/163 400/472 |
| 2013/0107674 A1 | 5/2013 | Gossweiler, III et al. |
| 2013/0146659 A1 | 6/2013 | Zhou et al. |
| 2013/0172068 A1 | 7/2013 | Zhou et al. |
| 2013/0197857 A1 | 8/2013 | Lu et al. |
| 2013/0271351 A1* | 10/2013 | Lyons ................... G04G 17/083 345/1.1 |
| 2013/0326583 A1* | 12/2013 | Freihold ............. G06F 3/04815 726/3 |
| 2014/0125618 A1 | 5/2014 | Panther et al. |
| 2014/0139637 A1 | 5/2014 | Mistry et al. |
| 2014/0160316 A1* | 6/2014 | Hwang ............ G06F 17/30268 348/231.99 |
| 2014/0281956 A1 | 9/2014 | Anderson et al. |
| 2014/0320434 A1* | 10/2014 | Pantel ..................... G06F 3/017 345/173 |
| 2015/0098309 A1 | 4/2015 | Adams |

(56) References Cited

OTHER PUBLICATIONS

International Search Report and Written Opinion for PCT/US14/51295 dated Jan. 27, 2015.
iam+ Wrist Phone.
U.S. Appl. No. 29/464,381, Nov. 27, 2013, Notice of Allowance.
International Search Report and Written Opinion for PCT/US15/53344 dated Dec. 22, 2015.
U.S. Appl. No. 29/506,320, Oct. 6, 2016, Restriction Requirement.
U.S. Appl. No. 29/506,314, Oct. 6, 2016, Restriction Requirement.

* cited by examiner

MULTI-MEDIA WIRELESS WATCH

CROSS-REFERENCE TO RELATED APPLICATIONS

The present invention claims priority to and the benefit of U.S. Provisional Application No. 61/866,372, filed on Aug. 15, 2013, entitled "Multimedia Wireless Watch," the entire content of which is incorporated herein by reference.

BACKGROUND OF THE INVENTION

1. Technical Field

Implementations of the present invention include wristwatches and bangle ornaments that comprise computing functionality.

2. Background and Relevant Art

In an increasingly quantized and connected world, innovators and consumers are seeking way of integrating technology more seamlessly into their daily lives. Modern smart phones have been one method by why consumers have increasingly integrated connectivity into their daily lives. For example, many smart phone users frequently user their phones to take and upload pictures, text friends, call friends, navigate streets, identify new restaurants, and perform other such activities.

An additional recent movement in integrating technology into consumer's lives has involved so-called "smart watches." Conventional smart watches vary dramatically in functionality and form. In general, many conventional smart watches include some form of rudimentary health tracking utilities. For example, many conventional smart watches include pedometers, which can be used to track the number of steps the user took. Similarly, many conventional smart watches include gyroscopes that can be used to detect movement during sleep.

In addition to providing health tracking, some conventional smart watches also provide limited forms of connectivity. In particular, conventional smart watches can communicate with a smart phone that is also owned by the smart watch user. For example, the conventional smart watch may be able to receive information from the smart phone through BLUETOOTH. For instance, a conventional smart watch may display a notification that the smart phone has received a text message. The notification may comprise brief information about the text message.

Conventional smart watches, however, suffer from several shortcomings. In particular, one will understand, that fitting the necessary components into a small form factor like a smart watch is an onerous task. In particular, because most consumers desire watches that are fashionable and attractive, there is a need for a smart watch that comprises a pleasing form-factor, while at the same time comprises a form-factor that allows the smart watch to function.

Additionally, conventional smart watches suffer from shortcomings in interface. One will understand that, in general, a smart watch will comprise less useable surface area for a user interface than a smart phone. Many conventional smart watches have failed to provide user interfaces that are both intuitive and visually useful. For example, the conventional smart phone user interface comprises a grid-like display of mobile applications. For several reasons, one will understand that displaying a large grid of several applications on a small smart watch display may provide a clumsy and inefficient user interface.

BRIEF SUMMARY OF THE INVENTION

Implementations of the present invention comprise systems, methods, and apparatus configured to provide users with an attractive and useful arm-wearable computer accessory. In particular, implementations of the present invention comprise wrist accessories that include integrated cellular phone capabilities, personal multimedia functionality, web-connectivity, and other similar features. Additionally, implementations of the present invention provide novel form factors and methods of interface and information display that address several shortcomings in the conventional art.

For example, implementations of the present invention comprise a smart watch system. The smart watch system can further comprise one or more processors and system memory. Additionally, the smart watch system can comprise a watchband extending from a first side of a touch-sensitive display to a second side of the touch sensitive display. The watchband can comprise a clasp mechanism that allows the watchband to be placed around a wrist. Further, the smart watch system can comprise the touch-sensitive display. The touch-sensitive display can be configured to display an interactive image and detect a contact moving continuously from a first edge of the touch-sensitive display toward a second, opposite edge of the touch-sensitive display. In response to the detection, the touch-sensitive display can display select function indicators in accordance with movement of the contact. The select function indicators can comprise four or fewer distinct, selectable icons.

Additionally, at least one implementation of the present invention can comprise a smart watch. The smart watch can comprise one or more processors and system memory. Additionally, the smart watch can comprise a watchband. The watchband can further comprise a clasp mechanism that connects a first portion of the watchband with a second portion of the watchband, allowing the watchband to form a circuit. The watchband can also comprise a hinge that allows the clasp mechanism to open and close. The watch band can be a bangle shape such that the watchband comprises a substantially consistent width and form. Additionally, the smart watch can comprise a touch-sensitive display. The touch sensitive display can be embedded within a top surface of the watchband. Further, the smart watch can comprise a curved battery embedded within the watchband. The curved battery can be located between the clasp mechanism and the hinge and separated from the touch-sensitive display by both the clasp mechanism and the hinge.

Further, implementations of the present invention include a method for interacting with a user on a smart watch. The method can include displaying an interactive image. The method can further include detecting a contact moving continuously from a first edge of the touch-sensitive display toward a second, opposite edge of the touch-sensitive display. In response to the detection, the touch-sensitive display can display select function indicators in accordance with movement of the contact. The select function indicators can comprise four or fewer distinct, selectable icons.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and apparatus configured to provide users with an attractive and useful arm-wearable computer accessory. In particular, implementations of the present invention comprise wrist accessories that include integrated cellular phone capabilities, personal multimedia functionality, web-connectivity, and other similar features. Additionally, implementations of the present invention provide novel form factors and methods of interface and information display that address several shortcomings in the conventional art.

Accordingly, in at least one implementation of the present invention, a fashionable and functional smart watch is provided. Embodiments can include a wearable computing device in the form of a wristwatch/bangle or ornament. As used herein, a smart watch can comprise a bangle-shaped, wrist mounted computing device, a computing device shaped like a conventional watch, or any number of other wrist mounted computing devices. In some embodiments, such wearable computing devices can include various multimedia and/or wireless functions. As such, embodiments herein can include a wearable smart watch 100.

Smart watches can include any combination of hardware and software that enable functionality such as telephony, electronic communications, intelligence (including contextual intelligence) including pushing and pulling relevant information, voice control, home automation, fitness tracking/coaching/calories burn, social interaction, offline and online media playback, extendibility (e.g., "apps"), interoperability (e.g., interfacing with other devices), etc.

Figure 1:
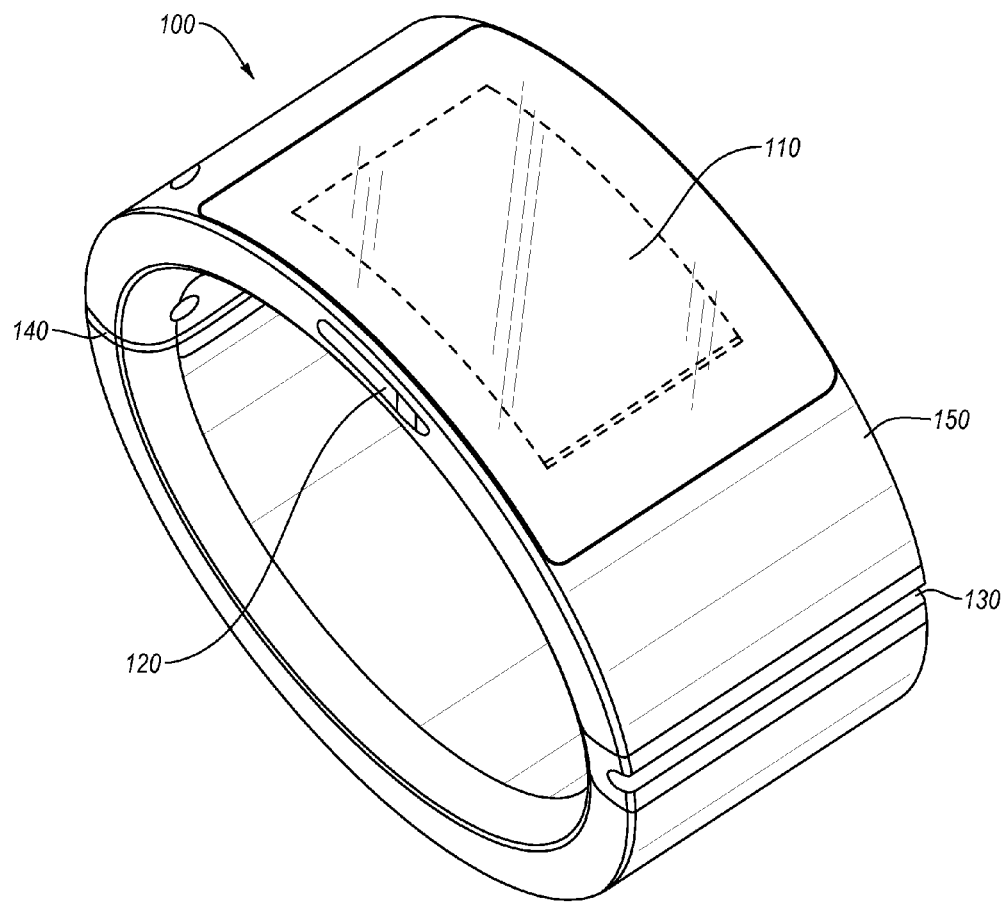
FIG. 1 illustrates an implementation of a smart watch.
Figure 2:
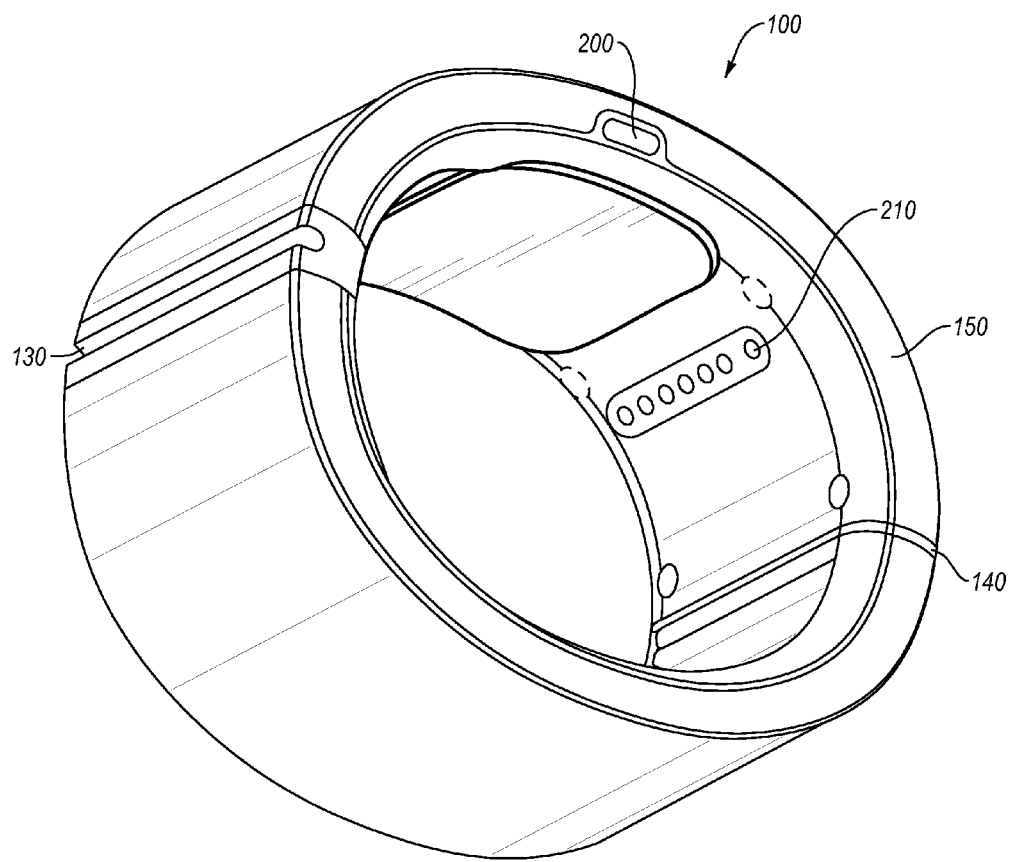
FIG. 2 illustrates another view of the smart watch of FIG. 1.

FIGS. 1 and 2 illustrate different views of an example of a smart watch 100 according to one or more embodiments of the present invention. As depicted, the smart watch 100 includes a display 110. For example, the smart watch 100 can include a display 110 based on any appropriate technology (e.g., LED, OLED, plasma, e-ink/e-paper, etc.). In some embodiments, the display 110 includes a touch digitizer (e.g., resistive, capacitive, etc.) to thereby create a touch-sensitive display (e.g., single- or multi-touch). In some embodiments, the display 110 is flexible. For example, the display may include a flexible display member comprising plastic, resin, polycarbonate, film etc., or may include a flexible glass display member (e.g., Corning® Willow™ Glass or film based OLED technology).

Additionally, the smart watch 100 includes a band 150. The band 150 may be comprised of a rigid material, a flexible material, or combinations thereof, and may include any material that is known in the art of watch making, as well as any other materials that can be used to form a rigid or a flexible band. In particular, the band 150 can comprise a ceramic material. Additionally, as depicted the band 150 can comprise a bangle shape. When describing the smart watch 100 the display 110 can be described as embedded within the band 150 or the band 150 can be described as attaching to respective ends of the display 110. Additionally, the band 150 can include one or more latches 140 and one or more hinges 130. Any latches 140 may employ any combination of fasteners, including mechanical and magnetic.

As depicted, the smart watch 100 may include one or more physical buttons 200. Any included buttons 200 may be usable to control an operating system and/or hardware devices of the smart watch 100. In at least one implementation, the smart watch 100 may include one or more additional output devices, such as one or more speakers, one or more lights, one or more headphone jacks, one or more haptic output devices (e.g., vibration units), etc.

Additionally, the smart watch 100 may also include a port 210. The port 210 may comprise one or more electronic connectors, and may be configured to provide power to the smart watch 100 (e.g., to charge any included battery or batteries) and/or to facilitate one- or two-way data transfer between the smart watch 100 and an external computing device (e.g., a general-purpose personal computer, an accessory device, etc.). The port 210 can comprise any appropriate data port type, such as a serial (e.g., USB, SPI) port.

One will understand that properly fitting the desired electronics into a form factor the size of a smart watch 100 can be a technically challenging process. This is particularly true when attempting to create a visually attractive product. Accordingly, one will appreciate that the technical and design decisions involved in achieving a particular form factor of a smart watch 100 and the technical and design decisions involved in the placement of components within a smart watch 100 can involve significant novelty and inventiveness.

Figure 3A:
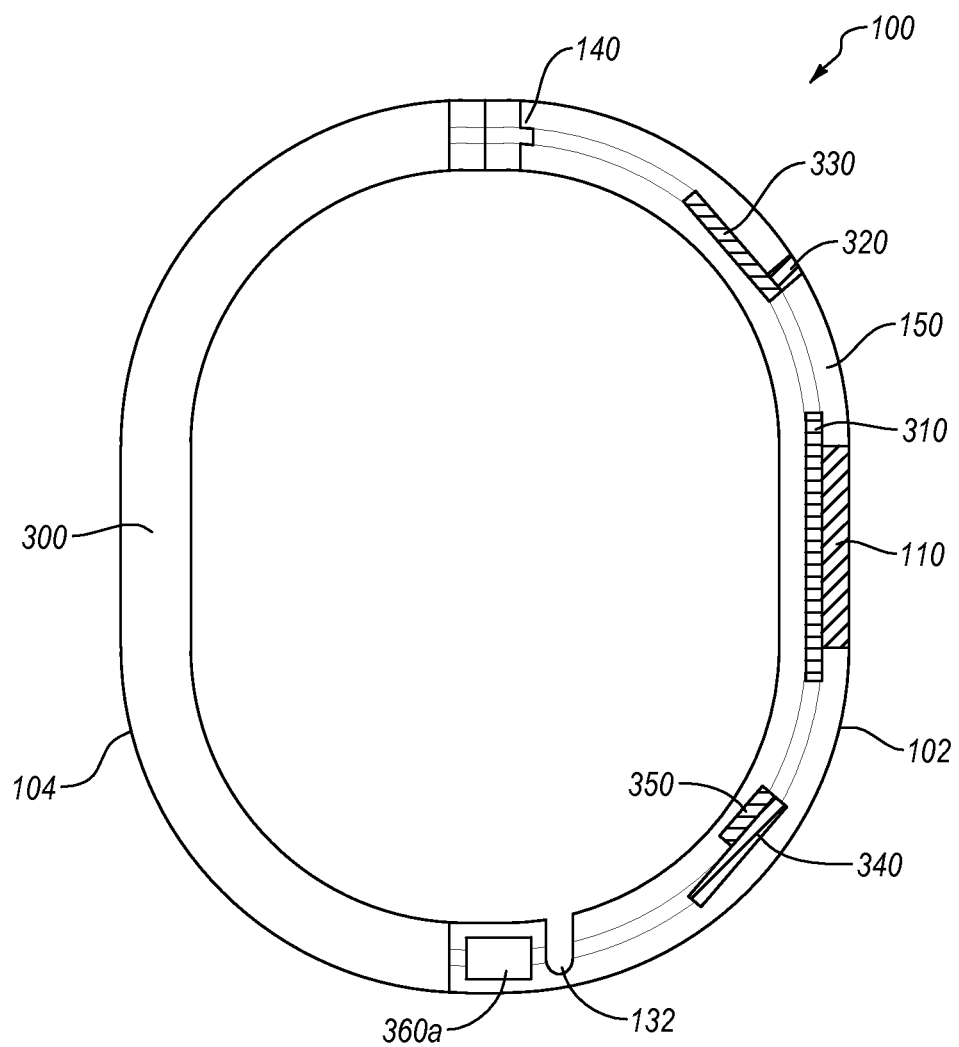
FIG. 3A illustrates a cross section of an implementation of the smart watch of FIG. 1.

For example, FIG. 3A depicts a cross-sectional view of the smart watch 100 of FIGS. 1 and 2. The depicted cross-section also exposes various internal components of the smart watch 100. In some embodiments, the band 150 includes one or more batteries 300 that are disposed therein. For example, the band 150 may include one or more flexible battery cells, and/or one or more rigid battery cells. When using rigid battery cells, the band 150 may include a plurality of linked (e.g., in series) battery cells that are positioned within the band 150 in a manner that permits some flexibility of the band 150. One will understand that the battery life is a significant concern when designing and using a smart watch 100. As such, the particular placement of a battery 300 within the band 150 may significantly influence the battery size, battery configuration, and overall aesthetic look and function of the device. Accordingly, the particulars relating to placement and configuration of the battery 300 within the band 150 addresses significant needs within the field.

In some embodiments, one or both of the display 110 or the band 150 may include one or more solar cells (not shown). The solar cells may be used to charge any batteries 300 disposed within the smart watch 100 or to supply power to computing hardware, the display 101, and/or any electronic lights, sensors, input devices, output devices, communications devices, or other electric components disposed within the smart watch 100.

Figure 3B:
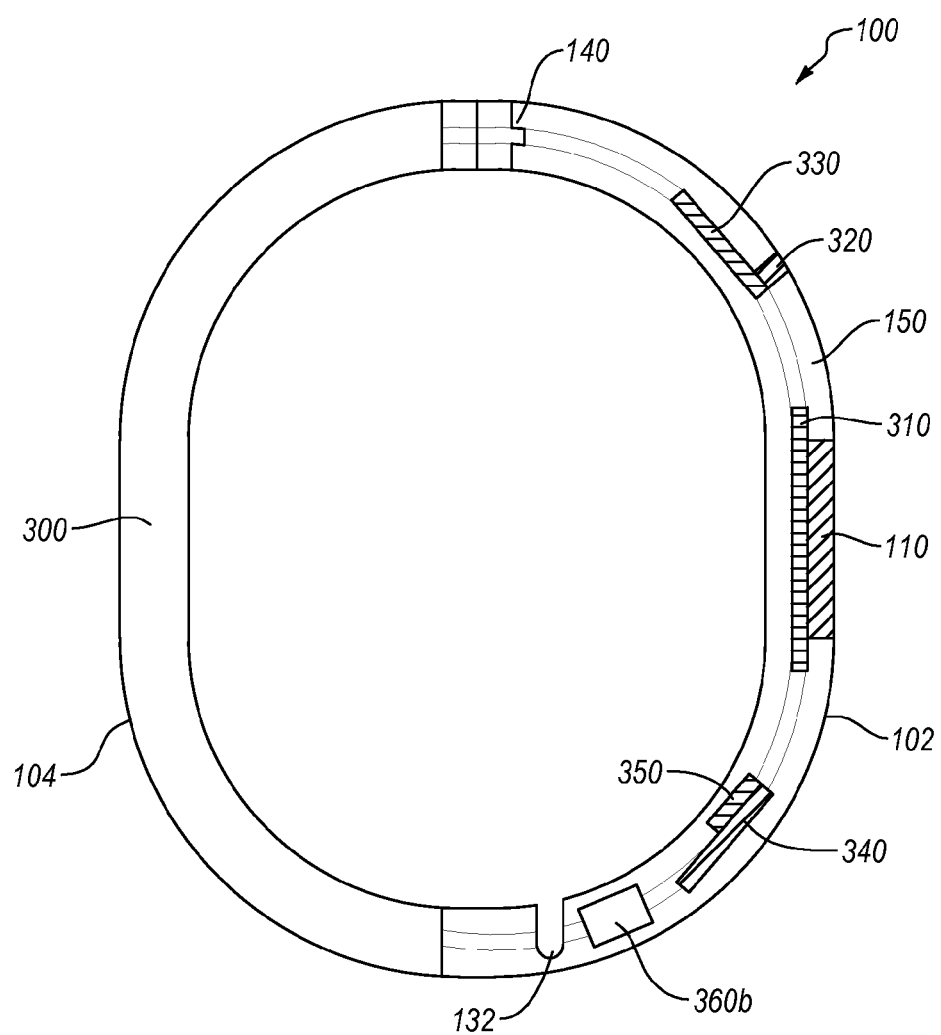
FIG. 3B illustrates a cross section of another implementation of the smart watch of FIG. 1.

FIGS. 3A and 3B depict various additional internal components of a smart watch 100. For example, a smart watch 100 can comprise a processing unit 310, a visual processing unit 330, a biometric unit 340, and various antennas 360(*a-b*). The processing unit 310 can comprise a general-purpose computer processor, a system-on-a-chip solution, or any other available processing hardware. In at least one implementation, the display 110 is in physical communication with the processing unit 310.

The visual processing unit 310 may comprise an external camera 320 that can receive photo and video information from outside of the band 150. Additionally, the visual processing unit 310 may comprise various image processing components, including but not limited to a graphics processing unit, support circuitry for the external camera 320, volatile and non-volatile memory, and other similar components. As depicted, unique from conventional smart watches, implementations of the present invention can comprise processing circuitry within the band 150. In contrast, conventional systems include the actual processing components behind the face of the watch. Though, some conventional systems may place hardware components such as cameras within a portion of a watch band, in contrast, to implementations of the present invention, actual processing components are not conventionally placed within the band. In particular, general processing components that are required for the fundamental operation of the smart watch are not placed within the band of conventional systems.

In at least one implementation, the processing unit 310 can also be located within the band 150 at a location that is not directly below the display 110. Additionally, in at least one implementation, the processing unit 310 can be located such that it is not immediately adjacent to the display 110, but is instead otherwise disposed within the band 150.

FIG. 3A also depicts the biometric unit 340 disposed at another location within the band 150. In particular, the biometric unit 340 is disposed between the display 110 and the hinge 130. The biometric unit 340 may comprise one or more of a variety of sensors. For example, sensors may be selected from among one or more accelerometers, one or more gyroscopes, one or more light sensors (e.g., for detecting ambient light), one or more biological sensors (e.g., for detecting heart rate, galvanic skin response, blood oxygen level, etc.), one or more microphones, one or more cameras, one or more thermometers (e.g., for detecting skin and/or air temperature), one or more barometers, one or more proximity sensors, one or more moisture sensors, one or more biometric sensors (e.g., fingerprint), etc. One will understand that one or more of these sensors may comprise additional components that rest on the outside of the band 150.

Additionally, the biometric unit 340 may also comprise user feedback components. For example, the biometric unit 340 may comprise a vibration unit 350. The processing unit 310 may activate the vibration unit 350 as a means to communicate to a user. For example, upon receiving an SMS text, an email, a phone call, or some other notification, the vibration unit 350 may activate to notify the user of a pending item.

In at least one implementation, the smart watch 100 can also comprise various antenna components 360(*a-b*) disposed within the smart watch 100. The antenna components 360(*a-b*) can comprise one or more short-range communications devices, such as BLUETOOTH, Wi-Fi, Near-Field Communications (NFC), ANT+, infrared transmitter/receivers, and other similar communication devices. As depicted in FIG. 3, the antenna component 360(*a-b*) may be disposed within the band 150 between the battery 300 and the hinge 130. In one or more alternate embodiments, the antenna component 360(*a-b*) can be disposed within the band 150 between the battery 300 and the latch 140. Further in at least one implementation, one or more antennas (e.g., WIFI, BLUETOOTH, 3G, etc.) can also be integrated into the same physical unit as the biometric unit 340 and the visual processing unit 330. Additionally, in at least one implementation, the antennas can be positioned in a standalone unit 360*b* that is positioned between the display 110 and the hinge 130 or latch 140. As such, in at least one implementation, one or more of the antennas 360(*a-b*) may be positioned between the display 110 and the latch 140 and/or between the display 110 and the hinge 130. In particular, positioning the 3G antenna on an opposite side of the display 110 from the WIF antenna and BLUETOOTH antenna may provide better signal propagation for the 3G antenna.

Additionally or alternatively, the antenna components 360(*a-b*) can include one or more long-range communications devices, such as cellular, geographical positioning (e.g., GPS, Galileo, GLONASS, IRNSS, etc.), etc. As such, the smart watch 100 can be enabled to connect to cellular networks (e.g., GSM, CDMA, LTE, etc.) for data and/or voice communications. In addition, the smart watch 100 can be enabled to receive positional and/or time data from a geographical positioning system.

In various implementations of the present invention, the various internal components of the smart watch 100 can be located in places other than shown in FIG. 3. For example, in at least one implementation, the biometric unit 340 and the visual processing unit 330 can be locationally switched. Additionally, in at least one implementation, the various components can all be placed between the battery 300 and the hinge 130 or latch 140.

Accordingly, implementations of the present invention place a wide variety of components within the band 150 of the smart watch 100. In particular, in a bangle shaped band, as shown in FIGS. 1-3, implementations of the present invention can place the battery 300 and various components 310, 320, 330, 340, 350, 360(*a-b*) between the battery 300 and the hinge 130 or latch 140.

In at least one implementation, to allow communication between the battery and/or the various adjacent components 310, 320, 330, 340, 350, 360(*a-b*) at least one wire extends through the hinge 130. In at least one implementation, the hinge 130 comprises a continuous portion 132 that continuously connects the upper 102 and lower 104 portions of the smart watch 100 together, even when the latch 140 is open. In at least one implementation, at least one wire extends through the latch 140. In particular, the latch 140 may comprise an integrated electric connector, such that when the latch 140 is closed a circuit is completed between the battery and/or components 310, 320, 330, 340, 350, 360(a-b) and the upper portion 102 of the smart watch 100.

As discussed above, properly fitting the necessary components within a conventional smart watch in a visually attractive package is a shortcoming present within the conventional art. Conventional smart watches either forgo significant functionality to fit the necessary components within a small watch face or conventional smart watches attempt to fit nearly every component within the watch face, resulting in a bulky and unattractive arm piece. As disclosed above, implementations of the present invention overcome this problem with novel methods of placing batteries, accessories, and crucial components within the band 150. Additionally, implementations of the present invention provide novel features that allow communication between components in to the lower portion 104 of the smart watch 100 with components in the upper portion 102 of the smart watch.

In addition to the various components, configurations, and form factors disclosed above, in at least one implementation of the present invention, the smart watch 100 also comprises a novel user interface. One will understand that implementing intuitive and effective user interfaces within conventional smart watches has resulted in several shortcomings. In particular, many conventional smart watches run operating systems that were originally designed for smart phones.

Most of these operating systems rely upon a home screen model. This model comprises one or more screens where applications are arranged in a grid-like pattern. These home screens are somewhat analogous to computer desktops. Within smart phones, home screens provide several benefits. For example, home screens provide a user a starting place, where important applications and functionalities can be arranged and readily accessible. For instance, a user may place the phone application and internet application in a readily available spot on the home screen. Additionally, home screens can provide a default location for a user to resort to when attempting to move from a first application to a second application.

When dealing with the extremely limited screen real estate on a conventional smart watch, however, displaying a large number of applications on a single home screen has several obvious problems. Accordingly, various conventional smart watches have experimented with and implemented a wide variety of different user interface schemes. These conventional user interfaces suffer from several shortcomings. For example, conventional user interfaces on smart watches move too far from a useful home screen. For example, some conventional smart watch user interfaces allow a user to sort through a potentially large number of applications one at a time. In particular, a user may push a button on the conventional smart watch to cycle through the applications. Some of these conventional smart watches may provide a pseudo home screen, which often comprises a digital representation of a watch face.

This scheme has several shortcomings. For example, the pseudo home screen (i.e., the digital watch face), while potentially providing useful information about time and date, fails to provide a user with quick access to crucial applications/functionalities within a single screen. Additionally, returning the user to the digital watch face also may return the user to the very beginning of the application list. For example, if a user has ten applications on a conventional smart watch and is currently executing the ninth application, but desires to switch to the tenth application. Returning to the home screen (e.g., the digital watch face) may require the user to cycle through all ten applications before being able to access the tenth application. Accordingly, there is a need for a smart watch user interface that provides a user with some of the functionality of a home screen, while at the same time not suffering from the obvious shortcomings of placing a full smart phone based home screen onto the limited screen real estate of a smart watch.

Figure 4:
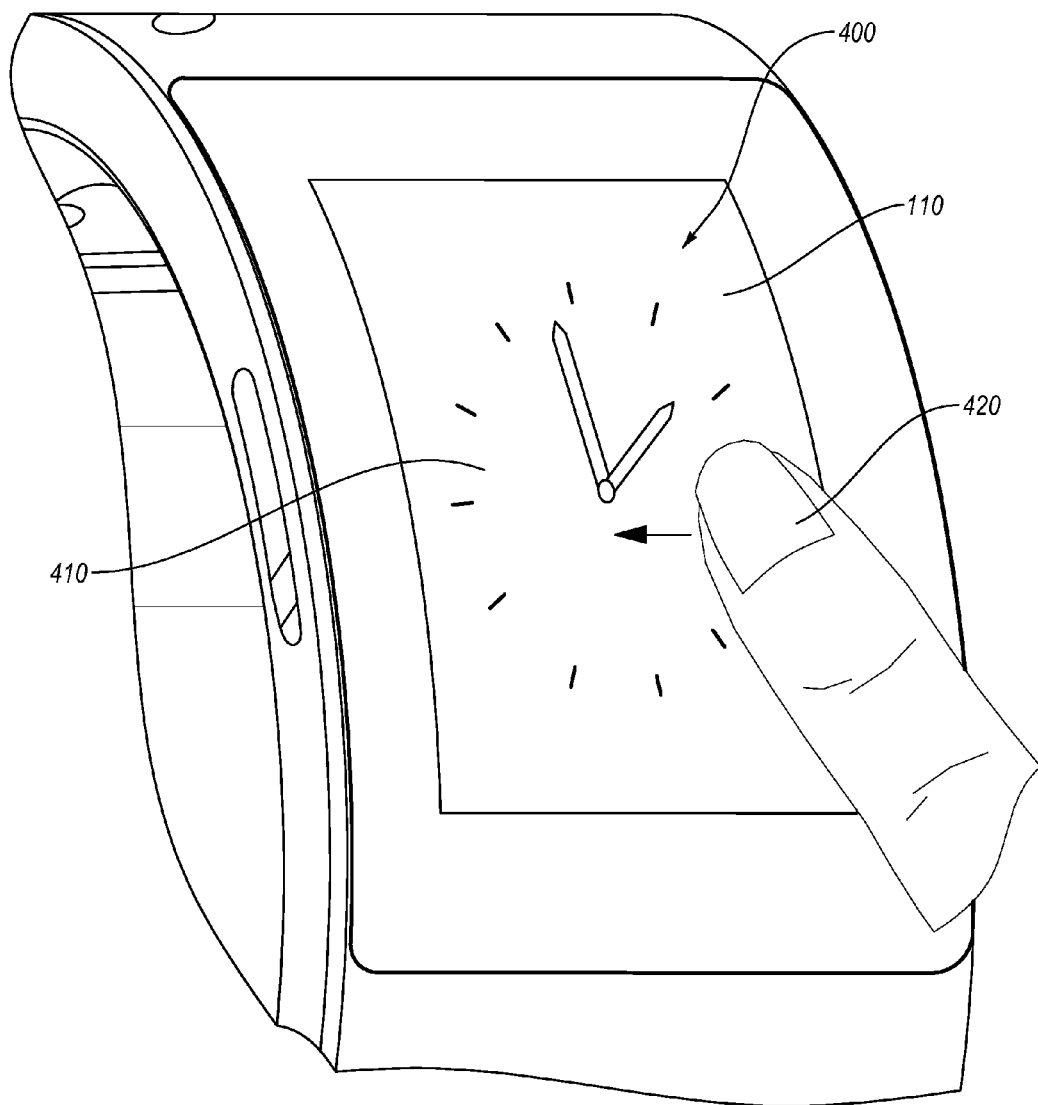
FIG. 4 illustrates an implementation of a user interacting with a user interface of a smart watch.

FIG. 4 depicts an implementation of a smart watch interface 400. In particular, the depicted smart watch interface 400 comprises a digital watch face 410. In at least one implementation, a wide variety of different types and styles of digital watch faces 410 are available for a user to choose between. Additionally, one will understand that the digital watch face 410 is merely exemplary.

Additionally, FIG. 4 depicts a detected contact 420 on the display 110. The detected contact 420 can comprise a detected finger contact with the display 110, a detected stylus contact with the display 110, or some other detection of user interaction with the display 110. In FIG. 4, the detected contact 420 is detected on the right side of the display 110 and is moving (as indicated by the arrow) towards the left side of the display. In alternate implementations, the detected contact 420 can both originate and be directed towards areas other than those shown. For example, the detected contact 420 may originate at the top of the display 110 and be directed towards the bottom of the display 110. In contrast, in at least one implementation, the detected contact 420 can be detected in the approximate middle of the display 110 and be directed towards a particular side of the display 110. Additionally, in at least one implementation the detected contact 420 may be required to cross the entire display (i.e., from side to side) before a particular action results.

Figure 5:
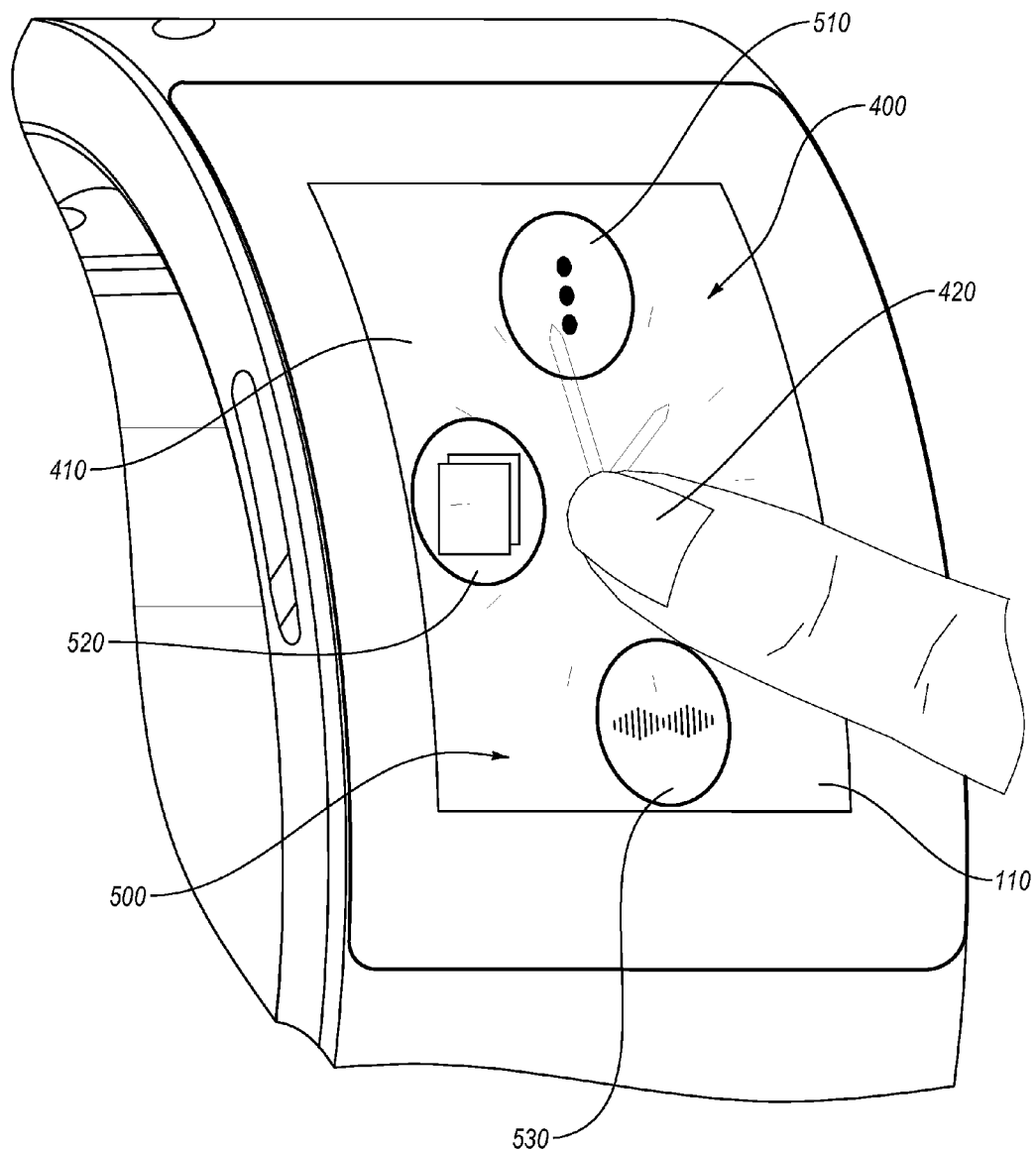
FIG. 5 illustrates an implementation of the user interface of FIG. 4.

FIG. 5 depicts the smart watch user interface 400 of FIG. 4 after the detected contact 420 has moved to approximately the middle of the display 110. In at least one implementation, after detecting a contact 420 in a pre-defined location (e.g., the right side of the display 110) followed by a pre-defined movement of the contact (e.g., towards the center of the display 110), the smart watch user interface 400 displays select function indicators 500. In accordance with the above disclosure, however, one will understand that in alternate implementations other pre-defined locations and pre-defined movements may be tied to launching the select function indicators 500.

In the implementation depicted in FIG. 5, the select function indicators 500 comprise a carousel application browser icon 510, a user information icon 520, and a voice features icon 530. In at least one implementation, the carousel application browser icon 510, a user information icon 520, and a voice features icon 530 can quickly and easily provide a user access to the key functions of the smart watch 100. In alternate implementations, however, additional or different icons and functions may be included within the select function indicators 500. Further, in at least one implementation, the select function indicators 500 may be user adjustable, such that a user can determine one or more of the icons that should be included within the select function indicators 500.

As depicted, in at least one implementation, the select function indicators 500 are overlaid on the smart watch user interface 400 that was previously present. Additionally, in at least one implementation, the underlying smart watch user interface 400 can continue to update itself. For example, the clock can continue to keep and display accurate time even though the select function indicators 500 are overlaid on the display 110. Additionally, in at least one implementation, the select function indicators 500 can be displayed over any smart watch interface 400. For example, the select function indicators 500 could be accessed within a smart watch interface 400 that comprises an internet portal, an SMS text interface, a camera interface, some other application, or any other interface on the smart watch 100.

The select function indicators 500 can also be removed from the screen. In at least one implementation, performing the opposite action required to activate the select function indicators 500 will cause the select function indicators 500 to be removed from the screen. For example, when a contact is detected in approximately the middle of the display 110 and the contact moves towards the right side (i.e., the opposite contact and movement of FIGS. 4 and 5) the select function indicators 500 can be removed from the screen, and the user can continue on the smart watch user interface 400 that was overlaid by the select function indicators 500. Additionally, in at least one implementation, once a user breaks continuous contact with the display the select function indicators automatically remove themselves.

Accordingly, implementations of the present invention comprise select function indicators 500 that overcome several of the problems within conventional smart watches. For example, implementations of the select function indicators 500 can be accessible from any screen within the smart watch 100. Additionally, in at least one implementation, the select function indicators 500 overlay the previously accessed smart phone user interface 400 and allow a user to return to the previously accessed smart phone user interface 400 directly from the select function indicators 500.

Using the select function indicators 500, a user is provided with quick access, from anywhere within the smart watch user interface 400, to several key functions of the smart watch 100. Additionally, the select function indicators 500 are laid out in a way that a user can easily select one of the provided options without accidently selecting the wrong icon. While the depicted number of icons within the select function indicators 500 is three, in alternate implementations fewer than three or more than three icons can be depicted. For example, an implementation of select function indicators 500 can comprise four, five, six, or more icons.

Once the select function indicators 500 are displayed a user can select one of the icons 510, 520, 530 to execute an application. In at least one implementation, selecting an icon comprises the user breaking contact with the screen, once the select function indicators 500 are displayed, and then again making contact with the screen on a particular icon 510, 520, 530. In an alternate implementation, selecting an icon comprises the user maintain the initial contact 420 (from FIG. 4) and sliding the contact to a particular icon 510, 520, 530. In other words, the movement of displaying the select function indicators 500 and selecting a particular icon 510, 520, 530 comprises a continuous movement where contact with the display 110 is maintained. In at least one implementation, once a user stops contact 420 with the display, the select function indicators 500 automatically are removed from the screen.

Figure 6:
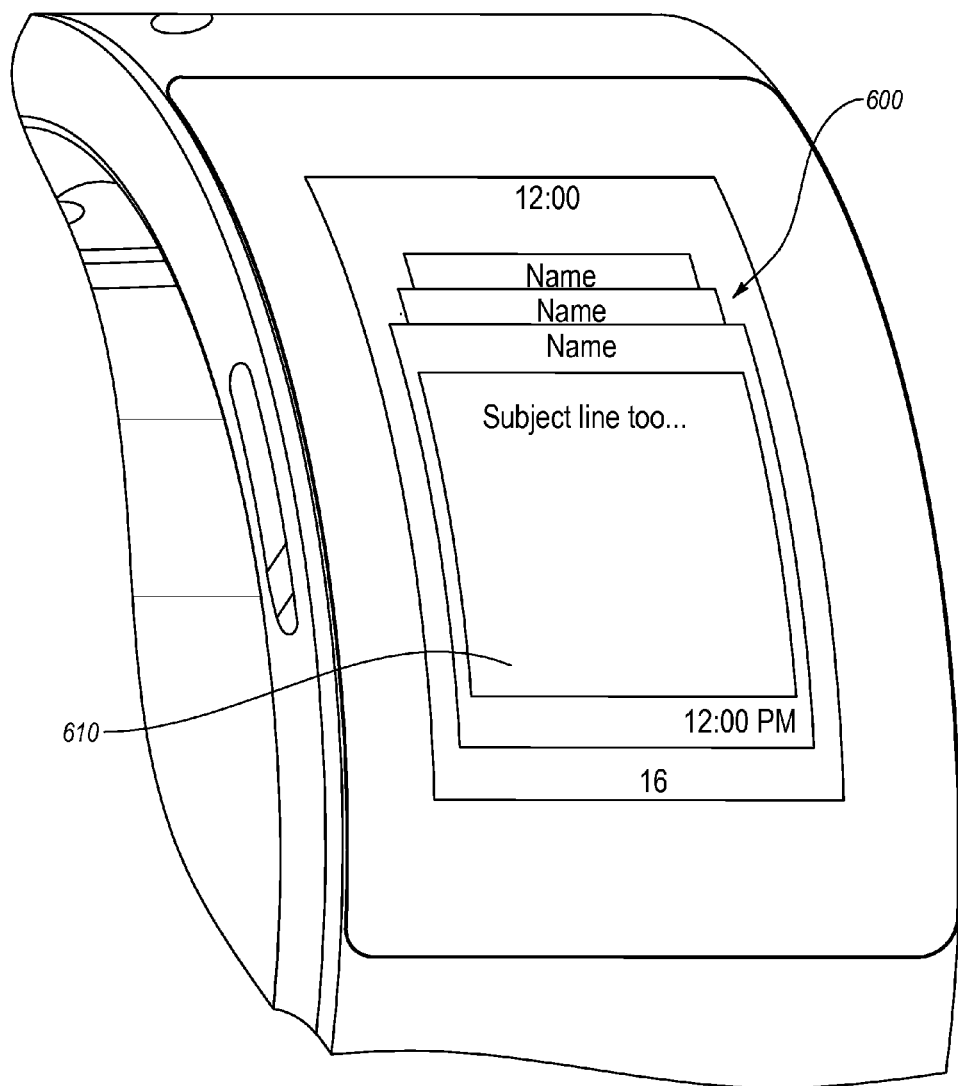
FIG. 6 depicts an implementation of a user interface of a smart watch.

FIG. 6 depicts an implementation of the user information application 600 that is associated with the user information icon 520. As depicted, in at least one implementation, the user information application 600 displays various notifications and user information items in a stacked card format. In particular, one or more cards 610 are displayed on the screen. Each card comprises information relating to a particular item. For example, the cards can comprise weather notifications, internet RSS feed notifications, SMS texts, emails, missed call notifications, voice mail notifications, and other similar information. In at least one implementation, information from a particular application can appear spread across multiple cards 610.

The user information application 600 can comprise notifications provided from other applications on the smart watch 100. Selecting a particular card 610 may execute an application that is associated with the information within the card or it may allow a user to create information within the user information application 600. For example, a particular card 610 may comprise an SMS text. In at least one implementation, selecting the card 610 may execute a dedicated SMS text application or it may allow a user to create a response SMS text within the user information application 600.

Additionally, in at least one implementation, navigating between the cards 610 can be achieved in my swiping the cards downward and/or upwards. In at least one implementation a swipe must originate from an edge of the display 110. In contrast, in at least one implementation, a swipe must originate from the middle of the display (or some other location other than a side) and be directed in a particular direction.

Figure 7:
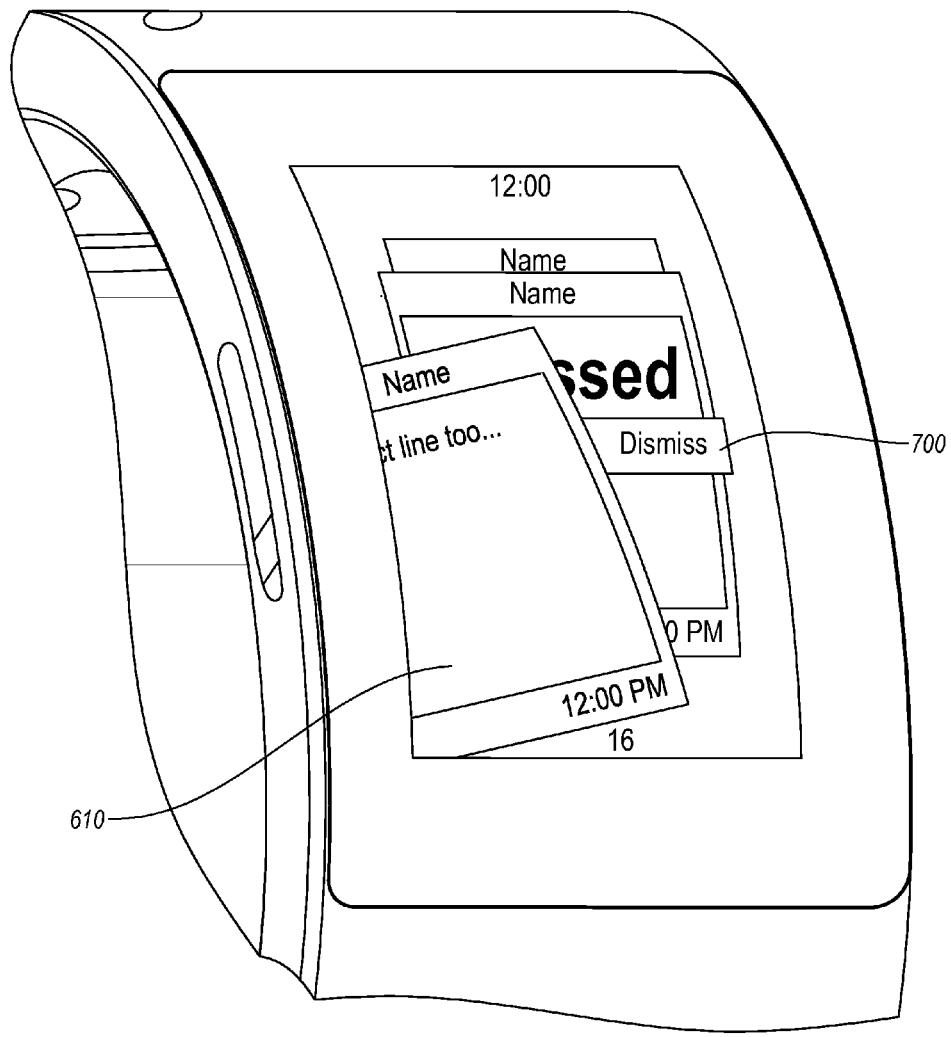
FIG. 7 depicts another implementation of a user interface of a smart watch.
Figure 8:
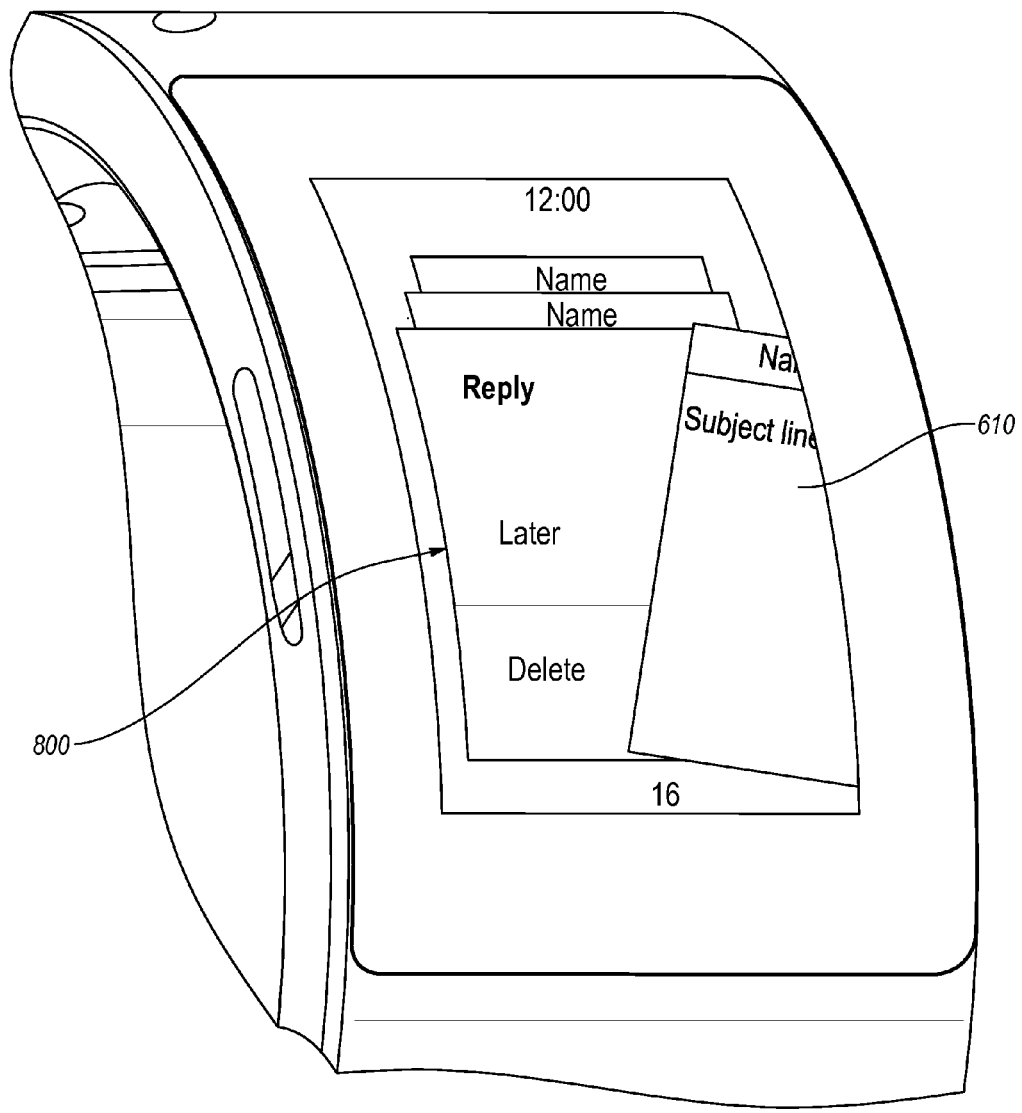
FIG. 8 depicts yet another implementation of a user interface of a smart watch.

In at least one implementation, additional movements can reveal various operations within the user information application 600. For example, FIG. 7 depicts a "dismiss" operation 700. In at least one implementation, this operation 700 can be revealed by swiping the active card 610 to the left. Similarly, FIG. 8 depicts similar operations 800 that can be revealed by a swipe to the right. In at least one implementation, the operations 700, 800 are standardized within the user information application 600. For example, in at least one implementation a left swipe may reveal a dismiss operation 700 while a right swipe may reveal operations 800 that are specific to the information on the card 610.

Figure 9:
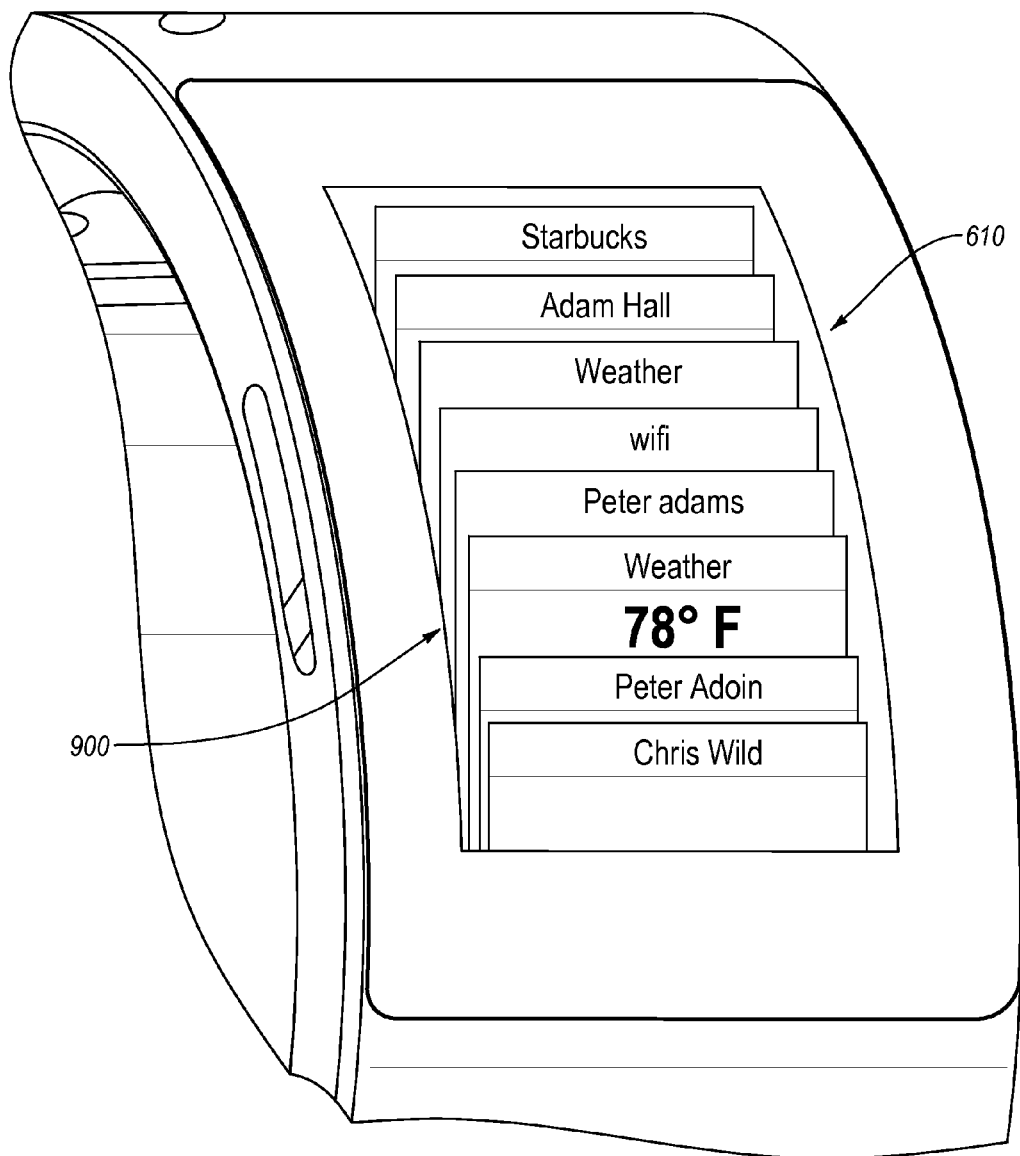
FIG. 9 depicts still another implementation of a user interface of a smart watch.

FIG. 9 depicts an implementation where the various cards 610 are displayed in a three-dimensional stacked view 900. In at least one implementation, a user can easily scroll through the various cards and pick a particular card 610 of interest. One will appreciate that this view may be particularly useful when a user is seeking out a particular card 610 among a large number of cards 610. In at least one implementation, the three-dimensional stacked view 900 is viewable in response to a particular detected contact and movement. For example, a double tap, a two finger tap, a pinch, or some other contact and/or motion may activate the three-dimensional stacked view 900.

Figure 10:
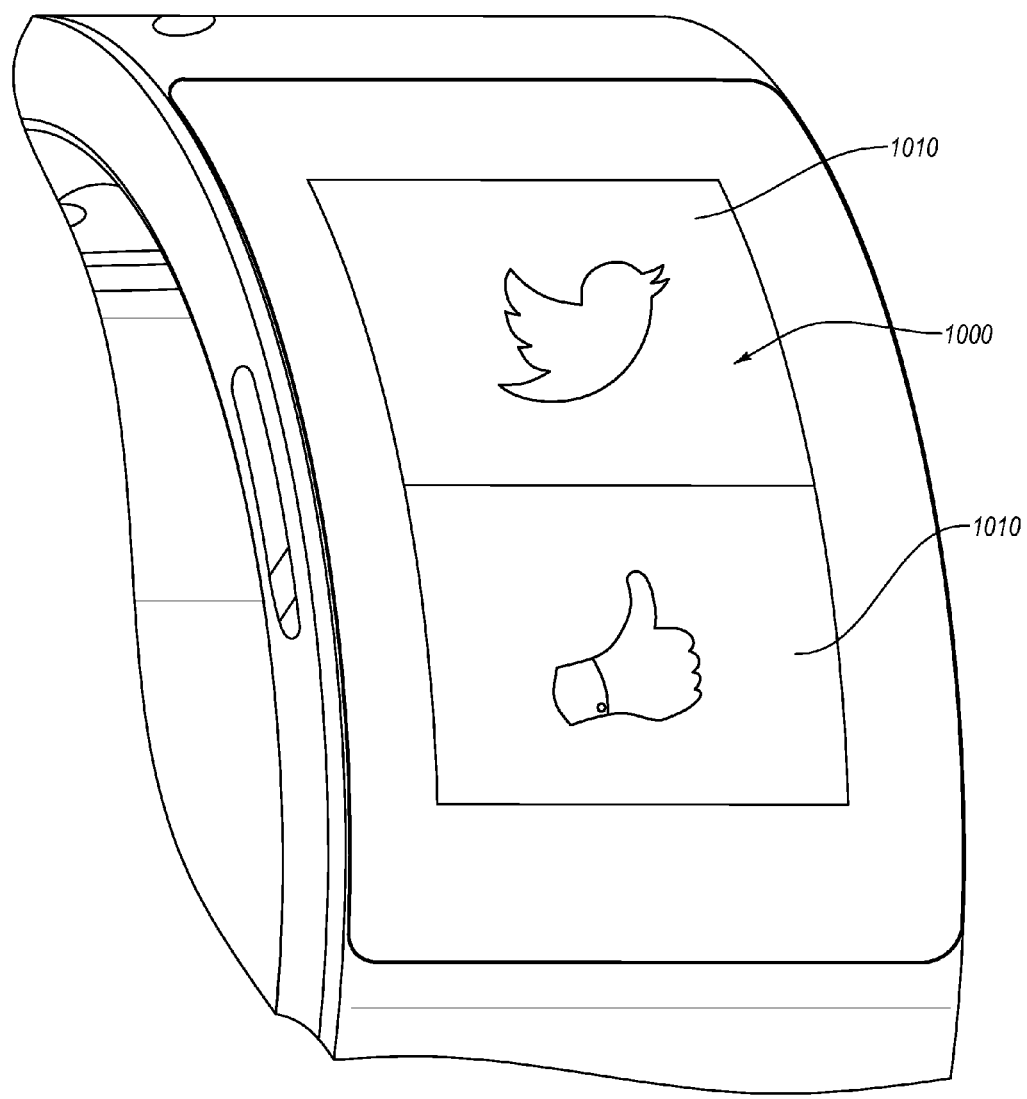
FIG. 10 depicts another implementation of a user interface of a smart watch.

FIG. 10 depicts an implementation of a carousel application browser 1000. The carousel application browser 1000 may be accessible from the select function indicators 500, from an independently executable application, by pushing a physical button on the smart watch 100, or through any other access means. In at least one implementation, the carousel application browser 1000 provides a scrollable depiction of icons associated with various applications installed on the smart watch 100. For example, FIG. 10 depicts icons associated with FACEBOOK and TWITTER.

In at least one implementation, upon entering the carousel application browser 1000, a user is able to scroll from top to bottom through one or more applications that are available on the smart watch 100. Additionally, in at least one implementation, a user may be able to access various options within the carousel application browser 1000.

For example, similar to the interface shown in FIGS. 7 and 8, a user may be able to swipe left or right, or perform some other predetermined contact and movement, to access options relating to the individual applications that are represented within the carousel application browser 1000. In at least one implementation, swiping a first direction, possibly left or right, will allow the user to access global options that apply to all applications (e.g., delete). In contrast, in at least one implementation, swiping a second direction, possibly left or right, will allow the user to access application specific options that apply to the application currently displayed and/or acted upon (e.g., change login).

In at least one implementation, the order of applications within the carousel application browser 1000 is determinable by a user. For example, a user may desire to place applications that are most commonly accessed so that they appear first within the carousel application browser 1000. In contrast, in at least one implementation, the applications are automatically ordered by the carousel application browser 1000. The carousel application browser 1000 may order the applications in the order in which they were most recently accessed, in the order of most commonly accessed, or through some other intelligent ordering method. For example, in at least one implementation the carousel application browser 1000 can intelligently order the applications based upon the user's location, the time of day, events scheduled in the user's calendar, or biometric information from the user. For instance, the carousel application browser 1000 may order a train payment application first when it detects that the user is walking into a train station. Similarly, the carousel application browser 1000 may order a fitness application first based upon a scheduled exercise time.

The carousel application browser 1000 depicted in FIG. 10 shows two application icons 1010 within the same screen. In at least one implementation, however, only a single entire application icon 1010 is displayed at a time. Nevertheless, portions of multiple icon application icons 1010 may be displayed as a user scrolls from a first application icon to a second application icon. In particular, an animation may depict a first icon leaving the screen as a second icon enters the screen. One will understand that a similar interface and animation may be used for more than a single application icon 1010 at a time.

Figure 11:
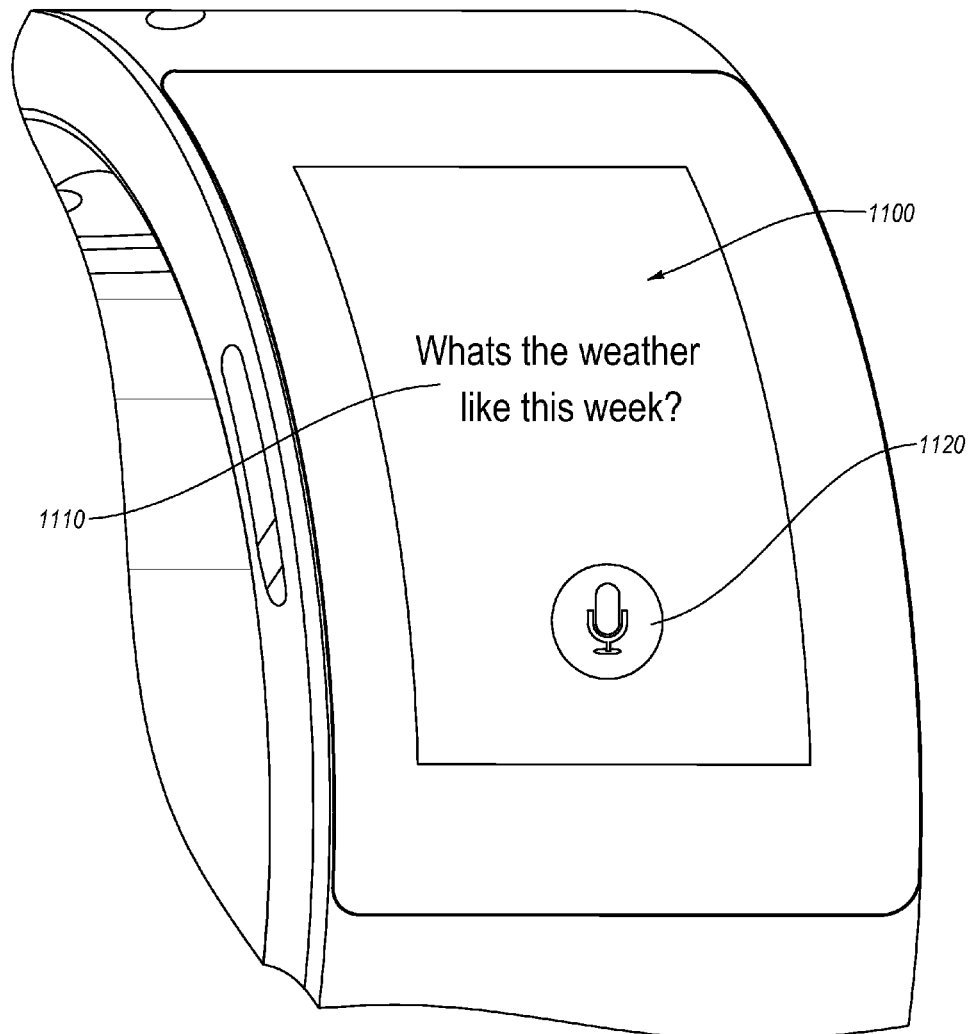
FIG. 11 depicts yet another implementation of a user interface of a smart watch.

FIG. 11 depicts a voice features application 1100 that can be displayed responsive to a user selecting the icon for voice features 530 from the select function indicators 500. In at least one implementation, the voice features application 1100 may also be accessible by pushing a button 200, performing a particular contact and movement on the display 110, or by issuing a particular voice command.

The voice features application 1100 may have access to one or more other standalone applications within the smart watch 100. For example, in at least one implementation, using the voice features application 1100 a user can send an SMS text, initiate a phone call, request a weather update, request directions, access a fitness application, or perform a variety of other functions that are available within the smart watch 100 system.

As depicted in FIG. 11, in at least one implementation, the voice features application 1100 transcribes the user's vocal words 1110. When transcribing a user's vocal words 1110 the voice features application 1100 can perform various filtering and smart interpretation to determine the user's commands. For example, the voice features application 1100 can user a dictionary to match interpreted vocal commands to the closest word in the dictionary. In at least one implementation, the interpretation of the user's vocal words 1110 is performed at a server to which the smart watch 100 communicates.

FIG. 11 also depicts an active icon 1120 within the voice features application 1100. The active icon 1120 may flash or perform some other animation to indicate that the voice features application 1100 is in a listening mode. In contrast to being in a listening mode, in at least one implementation that active icon 1120 may comprise an animation that indicates the voice features application 1100 is in a processing mode. During processing mode the voice features application 1100 may be communicating to server and may be unable to receive immediate voice commands.

Figure 12:
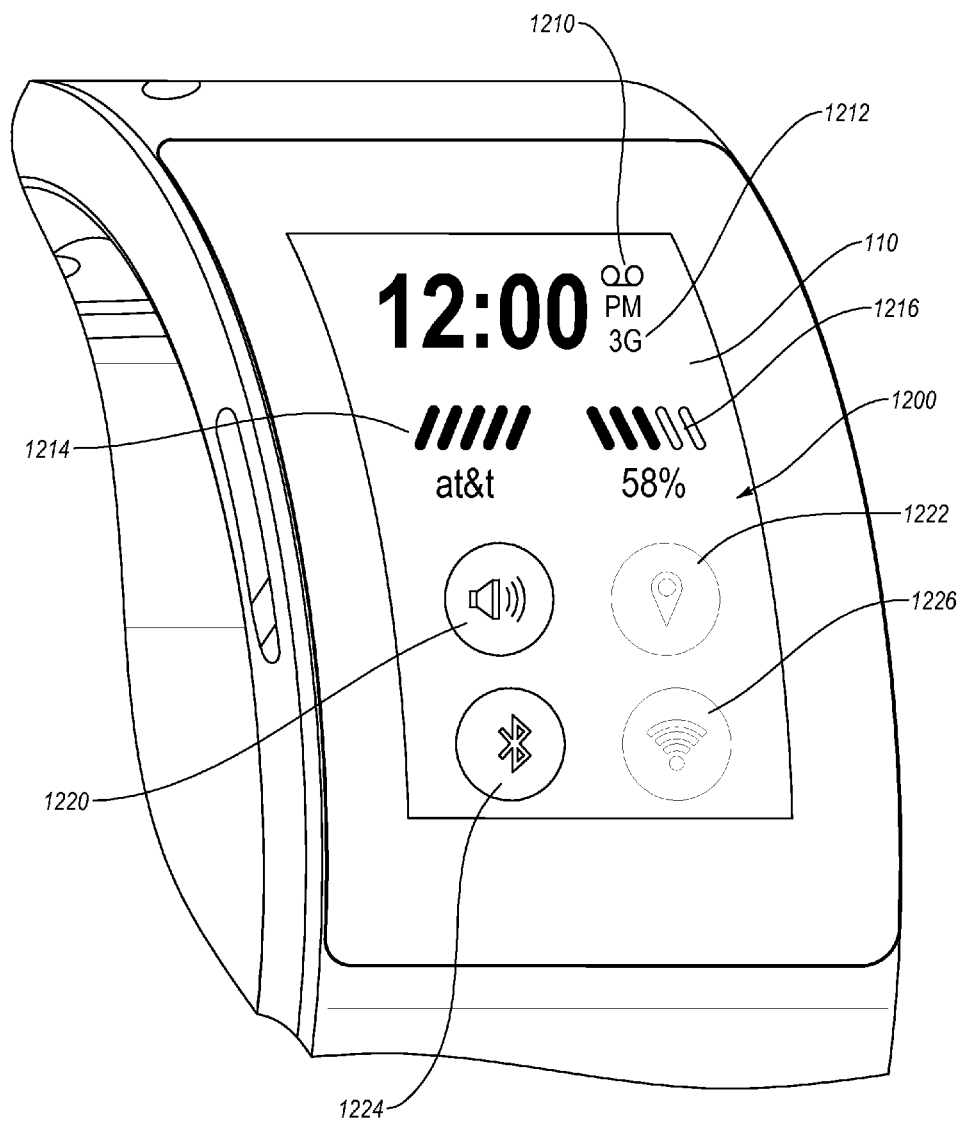
FIG. 12 depicts still another implementation of a user interface of a smart watch.

FIG. 12 depicts a status information screen 1200. The status information screen 1200 can be accessible from any other interface within the smart watch 100. In at least one implementation, the status information screen 1200 is accessible by contacting an edge of the screen 110 and moving the finger, in continuous contact, towards an opposite edge of the screen 110. For example, the status information screen 1200 may be accessible by contacting the top of the screen 110 and dragging a finger towards the bottom of the screen 110.

In at least one implementation, hiding the status information screen 1200, except when explicitly accessed, provides several benefits. For example, due to their form, smart watches 100 must always balance screen real estate with ease of accessing and interacting with information. This is particularly true when, like in the present case, the smart watch 100 comprises novel cellular communication features and other such advanced features. On one hand, like most cellular telephones, certain status information, such as single strength, signal type, battery strength, etc., are useful indicators. On the other hand, watch sized devices are not well suited for information dense screens.

Accordingly, significant advantages can be gained by providing a status information screen 1200 that is accessible from anywhere in the mobile watch user interface, but is otherwise hidden from view. For example, the status information screen 1200 of FIG. 12 provides information relating to the presence of voicemail 1210, the current network type 1212, the network signal strength 1214, and the battery strength 1216. One will understand that this information may be difficult to fit within the standard smart watch user interface. In particular, this information may be difficult to position in a readily viewable way when the smart watch is executing an application. Accordingly, providing a simple contact and movement (e.g., a downward swipe) that can access the status information can provide significant advantages over the prior art.

In addition to status information, the status information screen 1200 of FIG. 12 also comprises specific settings. In particular, the status information screen 1200 displays a sound setting 1220, a location service setting 1222, a BLUETOOTH setting 1224, and a WIFI setting 1220. In at least one implementation, these settings function as toggle switches to activate or deactivate particular features. For example, selecting the location services setting 122 may activate or deactivate a GPS module within the smart watch 100. Accordingly, a simple interface is provides through which a user can quickly access particular settings from any interface within the smart watch 100.

Figure 13:
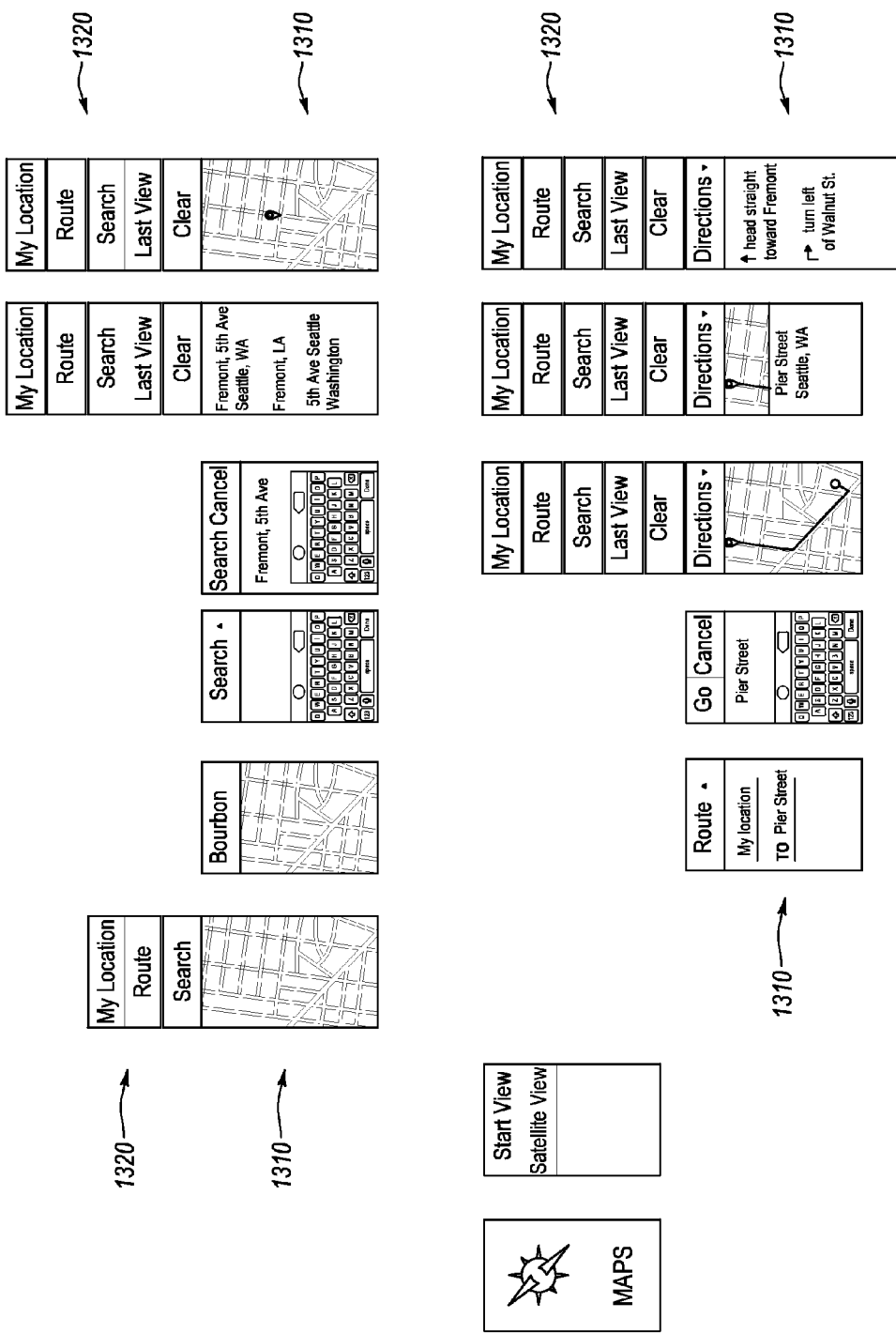
FIG. 13 depicts a flow chart of an implementations of a user interface of a smart watch.

FIG. 13 depicts an implementation of an interface for a map application 1300. The interface is provided for exemplary purposes, and one will understand that a similar interface can be applied to a variety of different applications. In particular, FIG. 13 depicts various possible screens and menu items that may be presented to a user when seeking directions.

The depicted interfaces comprise information screens 1310 and menu items 1320. The menu items 1320 are positioned within the figure to indicate that they are scrollable within the smart watch interface. In particular, the menu items 1320 may be accessible by scrolling from the top of the screen. In at least one implementation, contacting the screen at the very top and scrolling down will reveal the status information screen 1200. In contrast, contacting the screen near the top, but not at the top, and scrolling downward will reveal the menu items 1320. "Near the top" may comprise any contact that does not overlap with the edge of the display 110, any contact that is substantially lower than the top 10% of the display 110, or some other contact that is not immediately at the edge of the display 110. Additionally, in at least one implementation, contacting the display 110 at the middle of the display 110 and swiping down causes the menu items 1320 to scroll.

Accordingly, FIG. 13 depicts a novel method of providing a user with information screens 1310 and menu items 1320 within a smart watch 100. In particular, the depicted novel interface allows a user to have a large portion of the limited smart watch screen dominated by information of interest. At the same time, the disclosed interface can provide a user with a wide variety of menu items 1320 that are large enough to be easily selected with an touch input device (e.g., a finger).

One will understand, in light of the above disclosure, that a novel smart watch 100 as disclosed provides for a variety of different use cases. For example, the smart watch 100 may be configured to receive and place voice and/or video calls over a cellular network using cellular hardware, over a WiFi network using WiFi hardware, etc. In some embodiments, the smart watch 100 can play audio of a conversation over an integrated speaker, while in other embodiments the smart watch 100 plays audio of a conversation over an external speaker (e.g., via a headphone jack or Bluetooth). Similarly, in some embodiments, the smart watch 100 records audio of a conversation with an integrated microphone, while in other embodiments the smart watch 100 records audio of a conversation with an external microphone (e.g., via a headphone jack or Bluetooth). One or more cameras may capture still or video images of the wearer/user.

Additionally, as disclosed above, the smart watch 100 can comprise electronic communications functionality (e.g., SMS, MMS, e-mail). For example, the smart watch 100 can include voice control functionality. For instance, the wearer/user may initiate the composition of an email by saying, "compose e-mail to Richard Curtis," or "Reply." Any other voice control situations/functions are also possible, such as voice controls to initiate music playback, to initiate voice communications, to receive status (e.g., watch status), or to receive any other information (e.g., weather, movies, directions, etc.). For example, a wearer/user may be able to fetch directions home by saying, "What's the fastest way home?"

Additionally, the smart watch 100 may be configured to automatically push information to a wearer/user based on context (e.g., physical location, time of day, physical (biological) condition of the wearer/user, etc.). For example, the smart watch 100 may be able to detect that the wearer/user is in a transit system (and detect the wearer/user's location in the transit system), and push relevant information (e.g., time to next stop, further directions, weather at destination, receipt for fare payment, etc.) to the wearer/user. The smart watch 100 may be able to detect the wearer/user's location based on GPS, WiFi networks, ambient noise, scanning of NFC, notification of fare payment, etc.

In at least one implementation, the smart watch 100 may be able to push recommendations and/or advertising to a wearer/user based on the wearer/user's location. For example, the smart watch 100 can push a restaurant recommendation to the wearer/user based on the wearer/user's location. Recommendations may come based on paid advertising, social connections, time of day, etc.

Further, in at least one implementation, the smart watch 100 may be configured to operate within a home automation environment. For example, the smart watch 100 may communicate with home automation components locally (e.g., Bluetooth, NFC, WiFi) or remotely (e.g., over the Internet using a WiFi or a cellular connection). For instance, in at least one implementation, the smart watch 100 may be usable with a smart door lock to gain access to a physical location (e.g., a residence, a business, etc.). For example, a user may scan a NFC tag on a door that the user desires to access, and then enter a lock code on the display 110 (e.g., by changing the length of each of a plurality of bars) to gain access.

Additionally, the smart watch 100 may include fitness functionality. For example, the smart watch 100 may track workout and biological data, such as speed, pace, elevation, heart rate, cadence, strokes, laps, calories burned and/or burn rate, etc. The smart watch 100 may gather such workout and biological data using internal sensors, and/or using external sensors (e.g., sensors that interface/communicate with the smart watch 100 using Bluetooth or ANT+). As such, the smart watch 100 can function as a fitness computer/monitor to track a variety of physical activity (e.g., running, swimming, cycling, hiking, etc.).

In some embodiments, the smart watch 100 is configured to function as a general health monitor that can track biological information throughout the day and over time. For example, the smart watch 100 can track a user's activity level, steps, heart rate, etc. on an occasional or continuous basis. In addition, the smart watch 100 can receive and track other supplied information, such as calories consumed, weight, body fat percentage, etc. As such, the smart watch 100 can function as a personal health trainer/assistant.

Additionally, the smart watch 100 can be configured to receive courses/challenges from other users, such as friends on a social network. The smart watch 100 can then function as a virtual trainer/partner during a workout, to show pace, time ahead/behind the other user, etc. to help encourage and motivate a user during a workout. The smart watch 100 can also be configured to record a wearer/user's workout, and to send challenges to other users based on the recorded workout.

The smart watch 100 can also be configured as a personal media device, to play back locally- or remotely-stored media (e.g., music and videos). Media playback may be controllable via voice command (e.g., "play music," "play workout mix," "play Asaf Avidan," etc.), in addition to other control functions (e.g., menus, buttons).

The smart watch 100 can be configured to interface with a television or other home entertainment system, such as via Infrared, Bluetooth, Wifi, etc. As such, the smart watch 100 may be usable to view available programming, to initiate playback of programming, and otherwise control content at a home entertainment system. In some embodiments (as depicted), the smart watch 100 interfaces with a media provider (e.g., Netflix, Hulu).

Accordingly, FIGS. 1-13 and the corresponding text illustrate or otherwise describe one or more methods, systems, and/or instructions stored on a storage medium for interacting with a smart watch. One will appreciate that implementations of the present invention can also be described in terms of methods comprising one or more acts for accomplishing a particular result. For example, FIG. 14 and the corresponding text illustrate a flowchart of a sequence of acts in a method for interacting with a user on a smart watch.

Figure 14:
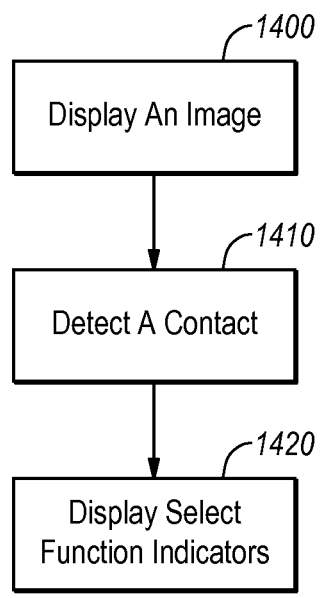
FIG. 14 depicts a flowchart of an implementation of a method for interacting with a user of a smart watch.

For example, FIG. 14 illustrates that a flow chart for an implementation of a method for interacting with a user of a smart watch can comprise an act 1400 of displaying an image. Act 1400 includes displaying an interactive image. For example, in FIGS. 4 and 5 depict a smart watch displaying an interactive image of a clock.

FIG. 14 also shows that the method can comprise an act 1410 of detecting a contact. Act 1410 includes detecting a contact moving continuously from a first edge of the touch-sensitive display toward a second, opposite edge of the touch-sensitive display. For example, in FIGS. 4 and 5 depict a smart watch detecting that user is interacting with the image by contacting and swiping.

Additionally, FIG. 14 shows that the method can comprise an act 1420 of displaying select function indicators. Act 1420 includes, in response to the detection, display select function indicators in accordance with movement of the contact. The select function indicators comprise four or fewer distinct, selectable icons. Additionally, the select function indicators can be displayed over the interactive image, which is only partially obscured by the select function indicators. For example, FIG. 5 depicts the presence of select function indicators that appeared in response to the detected contact.

Accordingly, the embodiments disclosed herein provide for a wearable computing device in the form of a smart watch 100 that can be used for a rich variety of functions, which can use a variety of sensors to gather information about a user/wearer and the context of the watch, and that can provide a variety of output on the watch and associated devices.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A smart watch system, comprising:
   one or more processors;
   system memory;
   a watchband extending from a first side of a touch-sensitive display to a second side of the touch sensitive display, wherein the watchband comprises a clasp mechanism that allows the watchband to be placed around a wrist; and
   the touch-sensitive display, wherein the touch-sensitive display is configured to:
      display an interactive image;
      detect a first contact moving continuously from a first edge of the touch-sensitive display toward a second, opposite edge of the touch-sensitive display;
      in response to the detection of the first contact, display select function indicators in accordance with movement of the first contact, wherein the select function indicators comprise four or fewer distinct, selectable icons;
      detect a second contact moving continuously from a third edge of the touch-sensitive display toward a fourth, opposite edge of the touch-sensitive display; and
      in response to the detection of the second contact, display continuously moving status information in accordance with movement of the second contact, wherein the status information comprises information relating to the wireless connectivity of the smart watch system.

2. The smart watch system as recited in claim 1, wherein the select function indicators comprise three or fewer distinct, selectable icons.

3. The smart watch system as recited in claim 1, wherein each of the distinct, selectable icons are selectable for executing a particular application.

4. The smart watch system as recited in claim 3, wherein a selectable icon is selected when the detected first contact moves, in a continuously detected movement, to one of the selectable icons.

5. The smart watch system as recited in claim 3, wherein the distinct, selectable icons comprise a first icon for a carousel application browser, a second icon for voice features, and a third icon for user information.

6. The smart watch system as recited in claim 5, wherein the first icon for the carousel application browser executes an application that provides a user with a visual representation of a plurality of applications, which visual representation comprises scrollable series of icons that scroll from a top of the touch-sensitive display.

7. The smart watch system as recited in claim 5, wherein the second icon for voice executes an application that receives voice commands from a user and executes functions based upon the received voice commands.

8. The smart watch system as recited in claim 5, wherein the second icon for voice executes a telephone application that allows a user to make telephone calls directly from the smart watch system.

9. The smart watch system as recited in claim 5, wherein the third icon for user information executes an application that displays to a user various information items and allows the user to interact with at least a portion of the various information items.

10. A smart watch, comprising:
    one or more processors;
    system memory;
    a watchband, wherein the watchband comprises:
       a clasp mechanism that connects a first portion of the watchband with a second portion of the watchband, allowing the watchband to form a circuit,
       a hinge that allows the clasp mechanism to open and close;
       a bangle shape such that the watchband comprises a substantially consistent width and form;
    a touch-sensitive display, wherein the touch sensitive display is embedded within a top surface of the watchband; and
    a curved battery embedded within the watchband, the curved battery being located between the clasp mechanism and the hinge.

11. The smart watch as recited in claim 10, further comprising a cellular antenna disposed within the watchband, the cellular antenna in communication with the one or more processor.

12. The smart watch as recited in claim 11, wherein the cellular antenna is disposed between the touch-sensitive display and the hinge.

13. The smart watch as recited in claim 10, wherein the watchband comprising a substantially consistent thickness around a circumference of the watchband.

14. The smart watch as recited in claim 10, wherein a Wi-Fi antenna is disposed within the watchband between the touch-sensitive display and the clasp mechanism.

15. The smart watch as recited in claim 14, wherein a GPS antenna is disposed within the watchband between the touch-sensitive display and the clasp mechanism.

16. The smart watch as recited in claim 15, wherein a communication port is disposed within an inner surface of the watchband and is positioned between the touch-sensitive display and the curved battery.

17. The smart watch as recited in claim 10, wherein the touch-sensitive display is curved to be substantially flush with an outer surface of the watchband.

18. The smart watch as recited in claim 10, wherein the watchband comprises a width of between 30 mm and 40 mm.

19. A method for navigating content within a bangle-shaped smart watch, the method comprising:
displaying an interactive image;
detecting a first contact moving continuously from a first edge of a touch-sensitive display toward a second, opposite edge of the touch-sensitive display; and
in response to the detection of the first contact, displaying continuously moving status information in accordance with movement of the first contact, wherein the status information comprises information relating to the wireless connectivity of the smart watch system;
detecting a second contact moving continuously from a third edge of the touch-sensitive display toward a fourth, opposite edge of a touch-sensitive display;
in response to the detection of the second contact, displaying continuously moving select function indicators in accordance with movement of the second contact, wherein the select function indicators comprise four or fewer distinct, selectable icons.

* * * * *